(12) United States Patent
Feldmann et al.

(10) Patent No.: US 9,194,331 B2
(45) Date of Patent: Nov. 24, 2015

(54) FLOW CONDUCTING ASSEMBLY FOR COOLING THE LOW-PRESSURE TURBINE HOUSING OF A GAS TURBINE JET ENGINE

(71) Applicant: MTU Aero Engines GmbH, Munich (DE)

(72) Inventors: Manfred Feldmann, Eichenau (DE); Norbert Schinko, Munich (DE); Christian Eichler, Munich (DE); Sandra Muschkorgel, Potsdam OT Marquardt (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 13/942,021

(22) Filed: Jul. 15, 2013

(65) Prior Publication Data

US 2014/0041360 A1  Feb. 13, 2014

(30) Foreign Application Priority Data

Aug. 9, 2012  (EP) ..................... 12179768

(51) Int. Cl.
| | |
|---|---|
| *F02K 3/02* | (2006.01) |
| *F02K 3/075* | (2006.01) |
| *F01D 11/24* | (2006.01) |
| *F01D 25/12* | (2006.01) |
| *F02K 3/06* | (2006.01) |

(52) U.S. Cl.
CPC ................ *F02K 3/075* (2013.01); *F01D 11/24* (2013.01); *F01D 25/12* (2013.01); *F02K 3/06* (2013.01); *F05B 2240/121* (2013.01); *Y02T 50/675* (2013.01)

(58) Field of Classification Search
CPC ............... F02K 3/00; F02K 3/02; F02K 3/04; F02K 3/06; F02K 3/075; F02K 1/386; F02K 1/36
USPC ............ 60/226.1, 262, 226.3, 228, 231, 782, 60/785, 795; 239/265.17, 265.23
See application file for complete search history.

(56) References Cited

U.S. PATENT DOCUMENTS

| | | | |
|---|---|---|---|
| 3,975,901 A | 8/1976 | Hallinger et al. | |
| 4,080,785 A * | 3/1978 | Koff et al. ..................... | 60/226.3 |
| 4,163,366 A * | 8/1979 | Kent ............................. | 60/226.1 |
| 4,841,726 A | 6/1989 | Burkhardt | |
| 5,404,713 A * | 4/1995 | Johnson ......................... | 60/204 |
| 5,704,207 A * | 1/1998 | Jensen et al. ................ | 60/39.091 |
| 6,227,800 B1 * | 5/2001 | Spring et al. .................. | 415/116 |
| 6,625,989 B2 * | 9/2003 | Boeck ............................ | 60/782 |
| 8,166,768 B2 * | 5/2012 | Birch et al. .................... | 60/772 |
| 8,181,443 B2 * | 5/2012 | Rago ............................. | 60/226.1 |
| 8,480,350 B2 * | 7/2013 | Winter .............................. | 415/1 |

(Continued)

FOREIGN PATENT DOCUMENTS

| | | |
|---|---|---|
| DE | 35 409 43 | 5/1987 |
| EP | 1004759 | 5/2000 |

(Continued)

*Primary Examiner* — Gerald L Sung
(74) *Attorney, Agent, or Firm* — Davidson, Davidson & Kappel, LLC

(57) ABSTRACT

A gas turbine jet engine having a main flow channel and a housing structure which radially surrounds this main flow channel. A housing gas flow flows in the same direction as the main flow in the main flow channel, the housing structure having a flow conducting assembly. The flow of the housing gas flow to and/or along the main flow channel may be adjusted by adjusting a flow conducting sheet.

10 Claims, 3 Drawing Sheets

(56) References Cited

U.S. PATENT DOCUMENTS

| | | |
|---|---|---|
| 2008/0141656 A1* | 6/2008 | Beutin et al. .................... 60/262 |
| 2008/0230651 A1* | 9/2008 | Porte .......................... 244/118.5 |
| 2008/0271431 A1* | 11/2008 | Porte .......................... 60/226.1 |
| 2010/0180573 A1* | 7/2010 | Ruston ........................ 60/226.3 |
| 2012/0073262 A1* | 3/2012 | Bulin .......................... 60/226.2 |
| 2013/0269366 A1* | 10/2013 | Haugen et al. ................. 60/783 |

FOREIGN PATENT DOCUMENTS

| | | |
|---|---|---|
| GB | 2078859 | 1/1982 |
| WO | WO9211444 | 7/1992 |

* cited by examiner

FLOW CONDUCTING ASSEMBLY FOR COOLING THE LOW-PRESSURE TURBINE HOUSING OF A GAS TURBINE JET ENGINE

This claims the benefit of European Patent Application EP 12179768.2-1267, filed Aug. 9, 2012 and hereby incorporated by reference herein.

The present invention relates to a gas turbine jet engine having a main flow channel and a housing structure which radially surrounds this main flow channel and in which a housing gas flow flows in the same direction as the main flow in the main flow channel.

BACKGROUND

In gas turbine jet engines, housing components must be cooled to bring the housing components to a tolerable temperature for the housing, since the housing is subjected to high temperatures by the combustion processes in the combustion chamber and the resulting hot combustion gases. Moreover, the cooling of the housing components is also used to adjust, for example, the size of the clearances between the turbine moving blades of the low-pressure turbine and a sealing structure situated on a housing structure, the so-called "outer air seal." The adjustment of this clearance between the turbine moving blades and the sealing structure on the housing influences the efficiency of the low-pressure turbine, and it varies depending on the load on the gas turbine jet engine, since the temperatures and the centrifugal forces occurring in the turbine blades, and thus the corresponding dimensions, may change under different loads on the engine. For this reason, it is already known to use a so-called active clearance control (ACC), in which, in a gas turbine jet engine having a multi-shaft dual-flow design, cooling air is taken from a bypass flow or secondary flow, which is generated by a front fan, and directed through corresponding lines and openings in the housing structure, between the bypass flow and main flow onto the inner wall of the housing structure which is situated in the main flow in the area of the low-pressure turbine.

DE 35 409 43 A1 shows a gas turbine jet engine illustrated in FIG. 1, which includes, in sequence from left to right, a front fan 1, a high pressure compressor 2, an annular combustion chamber 3, and a high pressure compressor drive turbine 4, downstream from which a low-pressure turbine 5 is aero-thermodynamically connected for the purpose of driving front fan 1.

Front fan 1 is coupled with low-pressure turbine 5 via a shared inner rotor system 6. In the high pressure or gas generator part, high pressure compressor 2 and associated compressor drive turbine 4 are coupled with each other via a shared rotor system 7. Rotor system 7 coaxially surrounds part of rotor system 6. The principle portion of the air flow supplied by front fan 1 (bypass or secondary air flow S) is fed into secondary channel 8 of the engine for the purpose of generating propulsion thrust; a remaining portion S' of the air flow supplied by front fan 1 reaches high pressure compressor 2 of the gas generator. The hot gas flow escaping from low-pressure turbine 5 is also used to generate propulsion thrust.

In an engine of this type, principle turbine components must normally be cooled for the purpose of managing the hot gas temperatures. For example, it would be possible to cool the inlet stationary blades of high pressure turbine 4 and also, for example, the moving blades of high pressure turbine 4 as well as, if necessary, for example, the stationary blades of the second stage of high pressure turbine 4. The compressor air used for the aforementioned cooling situations of high pressure turbine 4 may be taken from one or multiple suitable locations of high pressure compressor 2 and made available for the appropriate application, e.g., via the applicable inner rotor system. It is known to apply cooling air to relevant ring-shaped housing structures 9 and 10 of high pressure and low-pressure turbines 4 and 5 via comparatively costly and complicated pipe distribution systems, this cooling air being taken from the secondary channel of the engine.

In the engine in FIG. 1, a secondary air portion removed from the bypass flow is furthermore taken from the secondary flow via openings 11 situated in wall 12 of secondary channel 8 in the immediate vicinity of the relevant turbine housing structure (e.g., low-pressure turbine 5 in this case) for the purpose of cooling the turbine components and optimizing the blade clearance, and this secondary air portion is blown out against turbine housing structure 10 by way of an impact cooling (arrow F).

SUMMARY OF THE INVENTION

However, efficiency losses occur due to the removal of air from the bypass flow. Furthermore, additional pipelines are needed to conduct the air from the bypass flow to the low-pressure turbine housing. This, in turn, results in the engine having a greater weight.

It is an object of the present invention to provide a possibility of cooling housing structures and, in particular, the low-pressure turbine housing of a gas turbine jet engine which does not have or at least reduces the disadvantages of the prior art. In particular, an effective cooling of housing areas on the main flow channel and, in particular, the low-pressure turbine housing, is to be easily facilitated.

The present invention is based on the idea that a so-called housing gas flow or vent flow in the housing structure surrounding the main flow channel may be used for cooling the housing areas on the main flow channel of a gas turbine jet engine and, in particular, a low-pressure turbine housing if a flow conducting assembly is provided, with the aid of which the flow of the housing gas flow to and/or along the main flow channel may be adjusted so that air or gas flow already present in the housing structure is controlled and used to cool corresponding areas of the housing structure, for example the wall areas, preferably of the low-pressure turbine housing, adjacent to the main flow channel. Accordingly, the separate removal of cooling air from the bypass flow or secondary flow may be dispensed with, which results in an improvement of the efficiency. In addition, it is not necessary to provide any complex lines for conducting the cooling air from the bypass flow.

The flow conducting assembly may include at least one flow conducting sheet which divides the housing gas flow into at least two partial flows, so that one partial flow may be conducted near the main flow channel in the housing structure, and the other partial flow runs at a distance from the main flow channel in the housing structure. In this way, it is possible to achieve a corresponding cooling effect in the desired locations of the housing structure by targeted division of the housing gas flow into at least two or multiple partial flows which are conducted in different areas of the housing structure.

For this purpose, the partial flow channels may be designed in such a way that they may be closed and/or throttled, so that the flow speed in the partial flow channels is variable and/or no housing gas flow at all is conducted in the partial flow channel if it is closed.

Additionally or alternatively, the flow conducting sheet may have an adjustable design for the purpose of variably adjusting the partial flows, and/or it may have multiple variably closable openings, so that in addition to varying the flow speed in the partial flow channels, the quantity of the gas flow through the partial flow channels may also be adjusted. The corresponding cooling effect may also be influenced thereby.

The flow conducting assembly may have valves and/or throttle valves for adjusting the gas flow and/or for closing openings.

The housing gas flow may be controlled and/or regulated with the aid of the flow conducting assembly in such a way that different cooling effects may be achieved in certain locations of the housing structure. For this purpose, a controller and/or regulator may be provided which may control the settings of the different components of the flow conducting assembly, for example valves, throttle valves, flow conducting sheets and the like.

Feeding back ascertained parameters, such as temperatures, into certain areas of the housing structure makes it possible to implement a regulator, with the aid of which the division and/or distribution of the housing gas flow may be automated in such a way that the desired cooling effect and, in particular, a desired radial clearance may be set between the turbine blades of the low-pressure turbine and the low-pressure turbine housing or a sealing structure situated thereon.

The present invention having a flow conducting assembly in a housing structure which surrounds the main flow channel may be implemented in gas turbine jet engines having both a dual-flow design and a single-flow design, i.e., with or without a bypass channel.

BRIEF DESCRIPTION OF THE DRAWINGS

The attached drawings show a purely schematic representation as follows.

DETAILED DESCRIPTION

Additional advantages, characteristics and features of the present invention are clarified in the following detailed description of exemplary examples on the basis of the appended drawings. However, the present invention is not limited to these exemplary embodiments.

Figure 2:
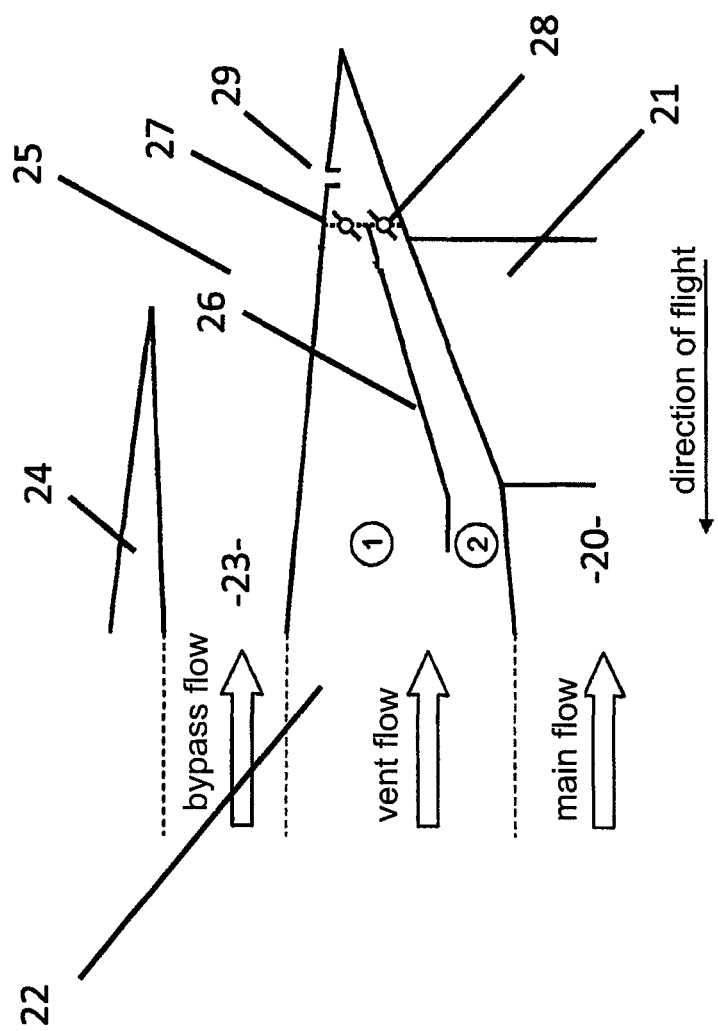
FIG. 2 shows a partial sectional view of a gas turbine jet engine according to the present invention.

FIG. 2 shows a partial axial section of a gas turbine jet engine according to the present invention in the area of low-pressure turbine 21. Main flow channel 20, in which the combustion gases flow in the direction of low-pressure turbine 21, is only partially illustrated.

Figure 1:
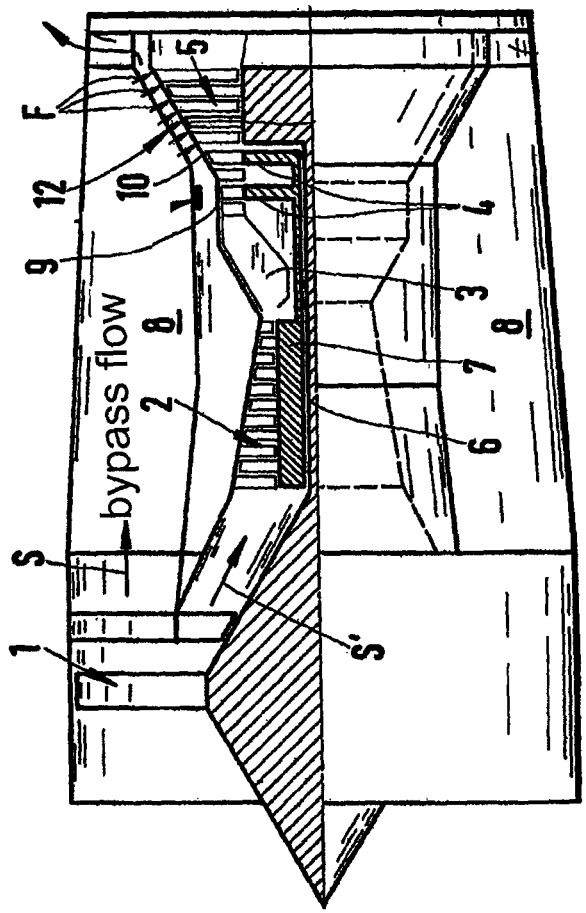
FIG. 1 shows a partial axial section of a gas turbine jet engine according to the prior art.

Main flow channel 20 is coaxially surrounded by a housing structure 22, which limits the main flow channel. In addition, similarly to the gas turbine jet engine in FIG. 1, the gas turbine jet engine partially illustrated in FIG. 2 has a bypass flow channel 23 in which an air flow generated by a front fan flows for the purpose of generating a propulsion thrust. Bypass flow channel 23 is limited by housing structure 22, on the one side, and by an outer housing 24, on the other side.

A so-called housing gas flow, which is also referred to as a vent flow and which is always present according to specific ventilation requirements of housing structure 22, flows in housing structure 22, which is located between main flow channel 20 and bypass flow channel 23.

As shown in FIG. 2, housing structure 22 has a flow conducting assembly 25, which includes a flow conducting sheet 26 and throttle valves or valves 27, 28, in the area of the low-pressure turbine.

With the aid of flow conducting sheet 26, the housing gas flow is divided into two partial flows: one partial flow which runs in the vicinity of main flow channel 20 and one partial flow which runs at a distance from main flow channel 20.

Flow conducting sheet 26 is adjustable, for example it may be swiveled, tilted or shifted, so that the flow cross-section may be variably adjusted for the partial flows of the housing gas flow. In this way, the gas mass flowing in the one partial flow or the other partial flow may be adjusted, and the heat transfer may thus be influenced. Due to the different flow ratios, the cooling settings may also be made for the outer wall of main flow channel 20 or the components situated therein, for example low-pressure turbine 21. By correspondingly adjusting the cooling by dividing the housing gas flow, it is also possible to set a clearance between the low-pressure turbine moving blades and a sealing structure or run-in coating (not illustrated) provided on housing structure 22.

Flow conducting sheet 26 may also be fixedly situated, whereby the throttle valves or valves 27, 28 influence the through-flow, or the through-flow may be set with regard to the flow speed by adjusting the valves.

Individual partial flow channels may also be completely sealed off by throttling the partial flows or closing individual partial flow channels via throttle valves or valves 27 and 28. After it passes through partial flow channels, the housing gas flow leaves housing structure 22 via opening 29 in the direction of bypass flow 23.

In connection with flow conducting assembly 25, a controller and/or regulator may be provided for carrying out the adjustment of the flow conducting assembly with the aid of detected parameters, such as temperatures on housing structure 22, for the purpose of achieving the desired cooling effect.

Figure 3:
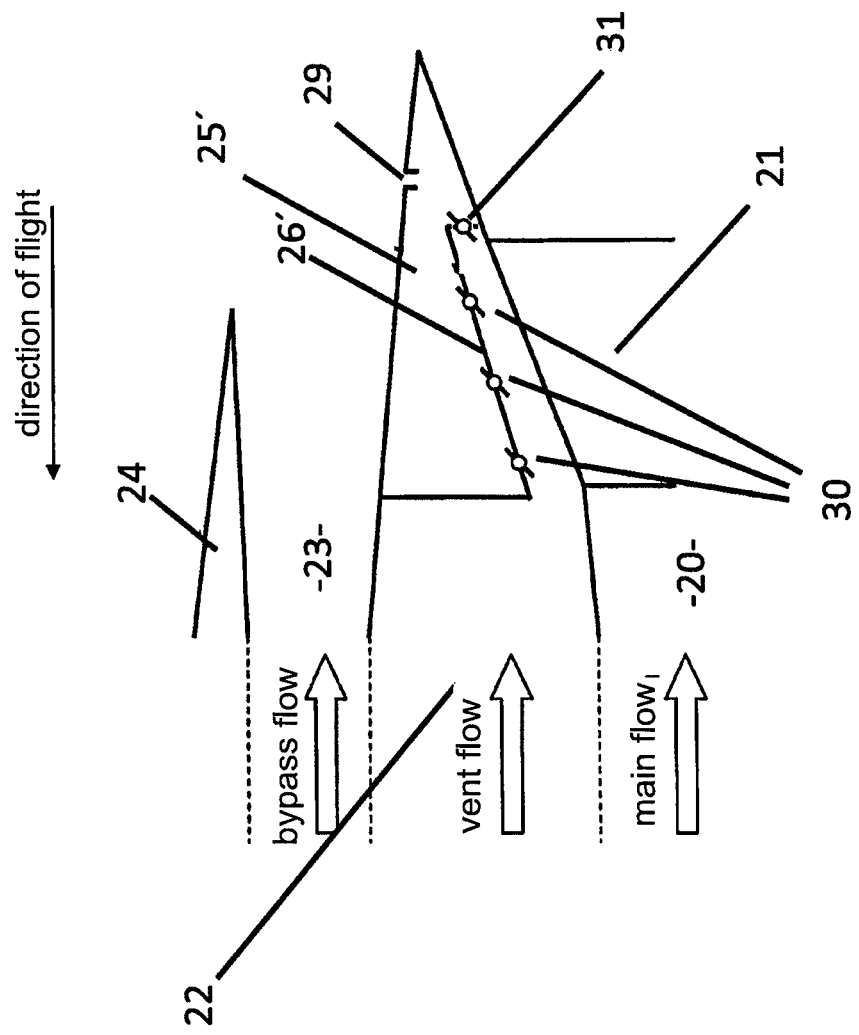
FIG. 3 shows a sectional view of another exemplary embodiment of a gas turbine jet engine according to the present invention.

FIG. 3 shows another specific embodiment of a gas turbine jet engine according to the present invention, identical or comparable components being provided with the same reference numerals as in FIG. 2. Accordingly, these components will not be described again.

Flow conducting assembly 25' provided in the specific embodiment in FIG. 3 differs from flow conducting assembly 25 in the specific embodiment in FIG. 2 in that flow conducting sheet 26' provided therein is not adjustable but has multiple openings 30 having valves and/or throttle valves, so that more or less gas flow may escape from the flow channel for the housing gas flow, limited by flow conducting sheet 26', depending on the adjustment of the throttle valves and/or valves in opening 30, so that the cooling effect on low-pressure turbine 21 may be set by the degree of escape and/or the flow speed in the flow channel. A throttle valve or a valve 31 at the outlet opening of the flow channel limited by flow conducting sheet 26' is used for this purpose. The housing gas flow, in turn, leaves housing structure 22 through opening 29 in housing structure 22, as in the specific embodiment in FIG. 2.

In the specific embodiment in FIG. 3, the cooling of the outer wall of main flow channel 20 and, in particular, the area of the low-pressure turbine may also be set with the aid of a corresponding control and/or regulating device, and a clearance between the moving blades of the low-pressure turbine and a sealing structure, the so-called outer air seal, may thus be set.

Although the present invention was described in detail on the basis of exemplary embodiments, it is a matter of course to those skilled in the art that the present invention is not limited to these exemplary embodiments, but instead modifications are possible in such a way that individual features may be omitted or different combinations of features may be implemented, provided that this does not depart from the scope of protection of the attached claims.

What is claimed is:

1. A gas turbine jet engine comprising:
   a main flow channel;
   a housing structure radially surrounding the main flow channel, a housing gas flow flowing in the housing structure in a same direction as a main flow in the main flow channel, the housing structure having an adjustable flow conducting assembly including at least one flow conducting sheet dividing the housing gas flow into a first partial flow running near the main flow channel and a second partial flow running at a distance from the main flow channel, the flow conducting sheet being adjustable or having variable closable openings so that a gas mass flowing in the first partial flow or the second partial flow is adjustable; wherein the flow conducting assembly is situated in the area of a low-pressure turbine; and
   a radially outer bypass flow channel having an outer housing, so that the housing structure, together with the flow conducting assembly, is situated between the bypass flow channel and the main flow channel.

2. The gas turbine jet engine as recited in claim 1 wherein channels for the first and second partial flows are closable or throttled.

3. The gas turbine jet engine as recited in claim 1 wherein the flow conducting assembly has valves for closing openings or adjusting the gas flow.

4. The gas turbine as jet engine recited in claim 3 wherein the valves are throttle valves.

5. The gas turbine jet as recited in claim 3 wherein the flow conducting sheet is fixedly situated, the valves adjustable to adjust the gas mass flowing in the first partial flow or the second partial flow.

6. The gas turbine jet engine as recited in claim 1 further comprising a controller or regulator controlling or regulating the housing gas flow with the aid of the flow conducting assembly.

7. The gas turbine jet as recited in claim 6 wherein the controller or regulator carries out adjustment of the flow conducting assembly in dependence on a temperature of the housing structure.

8. The gas turbine jet as recited in claim 1 wherein the flow conducting sheet is swivable.

9. The gas turbine jet as recited in claim 1 wherein the flow conducting assembly has two throttle valves located at a downstream end of the flow conducting sheet.

10. The gas turbine jet as recited in claim 1 wherein the housing structure has an exit opening in the direction of a bypass flow flowing around the housing structure.

* * * * *